(12) United States Patent　　(10) Patent No.:　　US 10,105,600 B2
Yasuda　　(45) Date of Patent:　　Oct. 23, 2018

(54) GAME PROCESSING METHOD AND RECORDING MEDIUM

(71) Applicant: Koei Tecmo Games Co., Ltd., Yokohama (JP)

(72) Inventor: Fumihiko Yasuda, Yokohama (JP)

(73) Assignee: KOEI TECMO GAMES CO., LTD., Yokohama (JP)

( * ) Notice: Subject to any disclaimer, the term of this patent is extended or adjusted under 35 U.S.C. 154(b) by 0 days.

(21) Appl. No.: 15/333,198

(22) Filed: Oct. 25, 2016

(65) Prior Publication Data

US 2017/0151502 A1　　Jun. 1, 2017

(30) Foreign Application Priority Data

Nov. 27, 2015　(JP) .................................. 2015-231986

(51) Int. Cl.
*A63F 13/52*　　(2014.01)
*A63F 13/20*　　(2014.01)
(Continued)

(52) U.S. Cl.
CPC .............. *A63F 13/52* (2014.09); *A63F 13/20* (2014.09); *A63F 13/25* (2014.09); *A63F 13/32* (2014.09);
(Continued)

(58) Field of Classification Search
None
See application file for complete search history.

(56) References Cited

U.S. PATENT DOCUMENTS 5,390,937 A * 2/1995 Sakaguchi .............. A63F 13/10
　　　　　　　　　　　　　　　　　463/2
6,340,330 B1 * 1/2002 Oishi ...................... A63F 13/10
　　　　　　　　　　　　　　　　　463/1
(Continued)

FOREIGN PATENT DOCUMENTS

JP　　2002-219280　　8/2002
JP　　2007-135791　　6/2007
(Continued)

OTHER PUBLICATIONS

FluentInNerd, Let's Play Super Mario Bros. 3 Part 1: Versus Mode, Nov. 21, 2011, https://www.youtube.com/watch?v=169dYm8_oxQ, p. 1.*
(Continued)

*Primary Examiner* — Tramar Harper
(74) *Attorney, Agent, or Firm* — Mori & Ward, LLP

(57) ABSTRACT

The information processing device 3 is caused to function as an information acquisition processing part 17 that acquires positional information of the other player character 33 located on a game field at the time of death of the other player character 33, an object display processing part 19 that displays based on the positional information an object 31 at the position corresponding to the death position of the other player character 33 on a game field on which the player character 33 is located, and a character appearance processing part 25 that causes a specter character 35 to appear in association with the object 31, and the specter character 35 is an enemy character corresponding to the other dead player character 33 and an enemy character with which the player character 33 is able to battle.

22 Claims, 8 Drawing Sheets

(51) Int. Cl.
  *A63F 13/25* (2014.01)
  *A63F 13/32* (2014.01)
  *A63F 13/335* (2014.01)
  *A63F 13/35* (2014.01)
  *A63F 13/56* (2014.01)
  *A63F 13/833* (2014.01)
  *A63F 13/537* (2014.01)
  *A63F 13/533* (2014.01)
  *A63F 13/58* (2014.01)

(52) U.S. Cl.
  CPC ............ *A63F 13/335* (2014.09); *A63F 13/35* (2014.09); *A63F 13/533* (2014.09); *A63F 13/537* (2014.09); *A63F 13/56* (2014.09); *A63F 13/58* (2014.09); *A63F 13/833* (2014.09); *A63F 2300/8029* (2013.01)

(56) References Cited

U.S. PATENT DOCUMENTS

| | | | | |
|---|---|---|---|---|
| 2001/0008398 | A1* | 7/2001 | Komata | A63F 13/10 345/156 |
| 2002/0142834 | A1* | 10/2002 | Sobue | A63F 13/12 463/30 |
| 2003/0017873 | A1* | 1/2003 | Ohara | A63F 13/10 463/42 |
| 2004/0259614 | A1* | 12/2004 | Machida | A63F 13/10 463/1 |
| 2004/0259617 | A1* | 12/2004 | Machida | A63F 13/10 463/5 |
| 2004/0259636 | A1* | 12/2004 | Machida | A63F 13/10 463/30 |
| 2007/0060342 | A1* | 3/2007 | Sakaguchi | A63F 13/10 463/31 |
| 2007/0111802 | A1* | 5/2007 | Ishihara | A63F 13/10 463/43 |
| 2011/0077078 | A1* | 3/2011 | Taoka | A63F 13/10 463/31 |
| 2011/0190063 | A1* | 8/2011 | Kajii | A63F 13/795 463/42 |
| 2013/0344967 | A1 | 12/2013 | Kajii | |
| 2014/0243079 | A1* | 8/2014 | Tsukioka | A63F 13/12 463/29 |

FOREIGN PATENT DOCUMENTS

| | | |
|---|---|---|
| JP | 2007-215751 | 8/2007 |
| JP | 2010-088694 | 4/2010 |
| JP | 2010-088695 | 4/2010 |
| JP | 2012-125286 | 7/2012 |

OTHER PUBLICATIONS

Fighting Studio, Clock Tower 3, perfect strategy guide, Capcom Co., Ltd., Capcom perfect strategy guide series 27, Jan. 30, 2003, p. 017 to p. 018 and p. 024 to p. 025, First Copy.

Japanese Office Action for corresponding JP Application No. 2015-231986, dated Dec. 27, 2016.

Submission of Certification of Exceptions to Lack of Novelty of Invention filed in corresponding JP Application No. 2015-231986, Dec. 1, 2015, w/ Certification of Translation of the same, enclosing Certification to Receive Application of the Provisions of Exception to Lack of Novelty of Invention.

* cited by examiner

[FIG. 1]
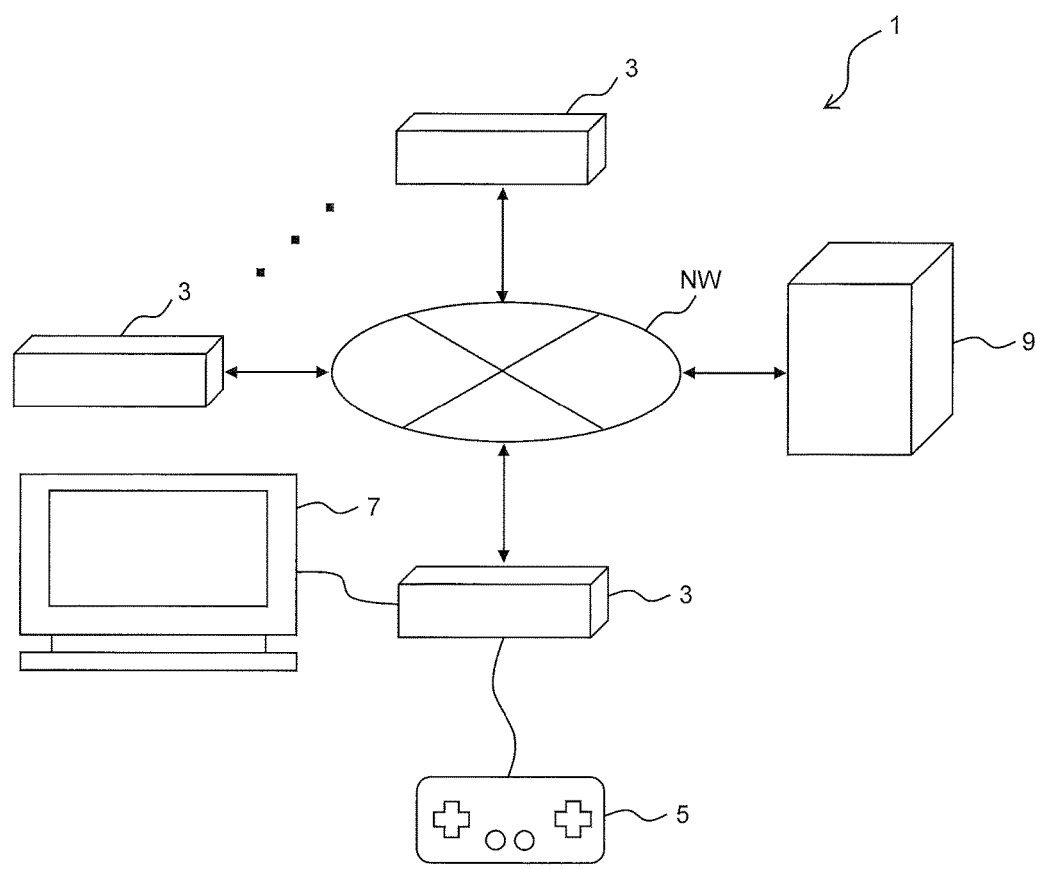

[FIG. 2]
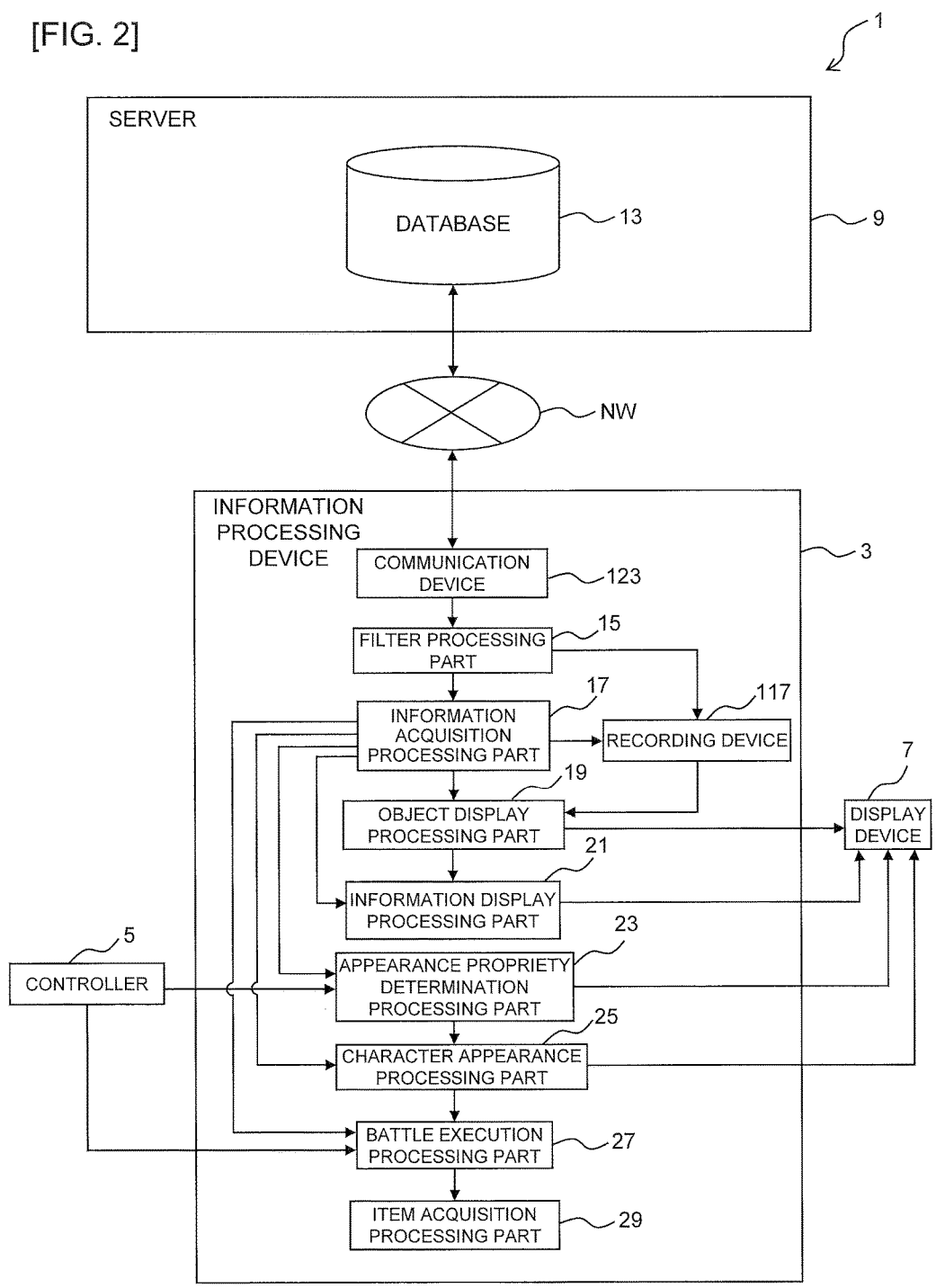

[FIG. 3]

| PLAYER NAME | CHARACTER LEVEL | EQUIPPED ITEM | CHARACTER DATA | POSITION | CAUSE OF DEATH | ... |
|---|---|---|---|---|---|---|
| PLAYER B | 3 | SWORD B<br>TORSO PROTECTOR B<br>ARM PROTECTOR B<br>LEG PROTECTOR B | ... | (XB, YB) | KILLED WITH SWORD BY ENEMY CHARACTER B | ... |
| PLAYER C | 10 | SWORD C<br>SPEAR C<br>HEAD PROTECTOR C<br>TORSO PROTECTOR C<br>LEG PROTECTOR C | ... | (XC, YC) | KILLED WITH SWORD BY ENEMY CHARACTER C | ... |
| PLAYER D | 5 | BOW D<br>HEAD PROTECTOR D<br>TORSO PROTECTOR D<br>ARM PROTECTOR D | ... | (XD, YD) | DEATH FROM FALL FROM CLIFF | ... |
| ... | ... | ... | ... | ... | ... | ... |

13

[FIG. 4]
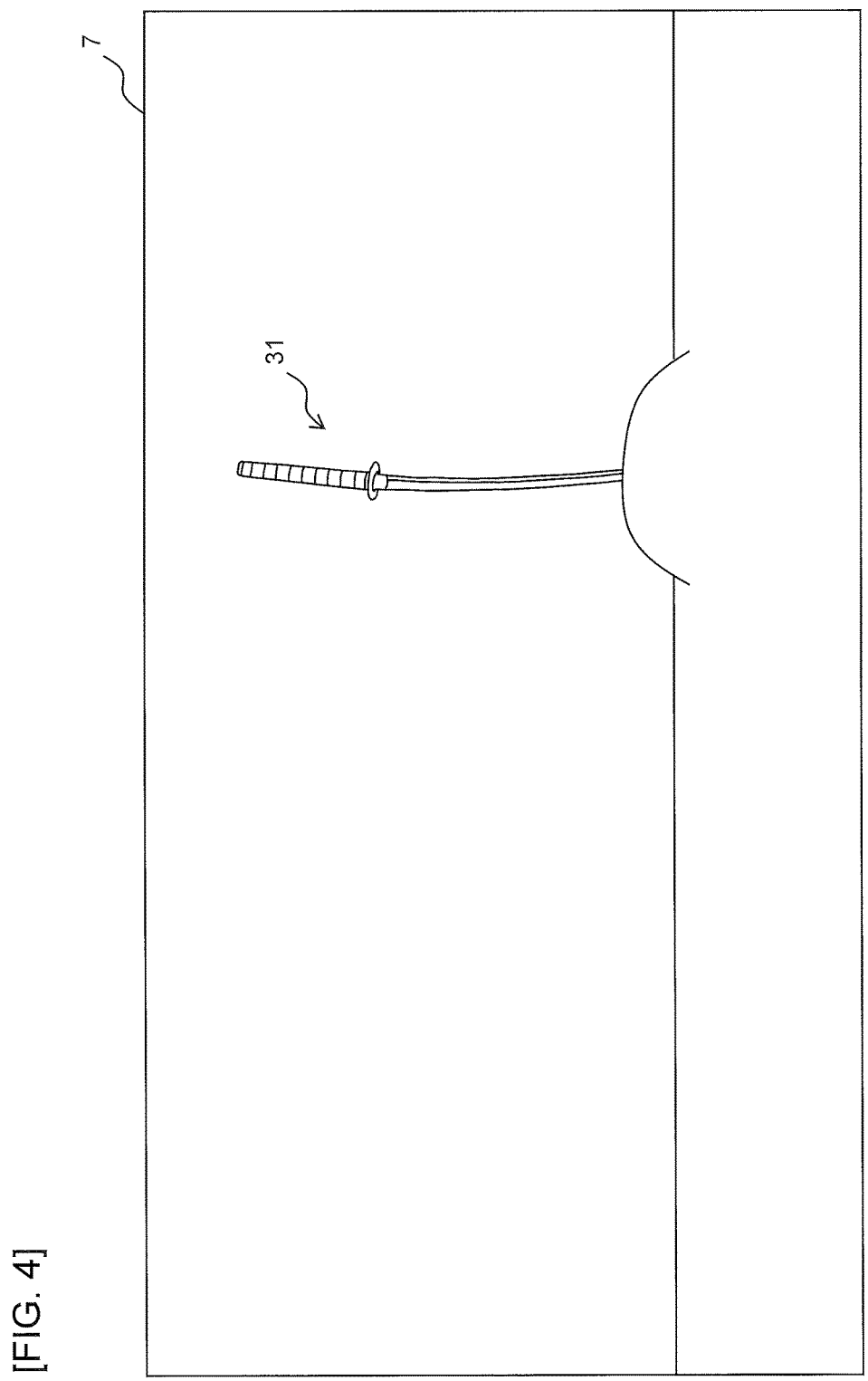

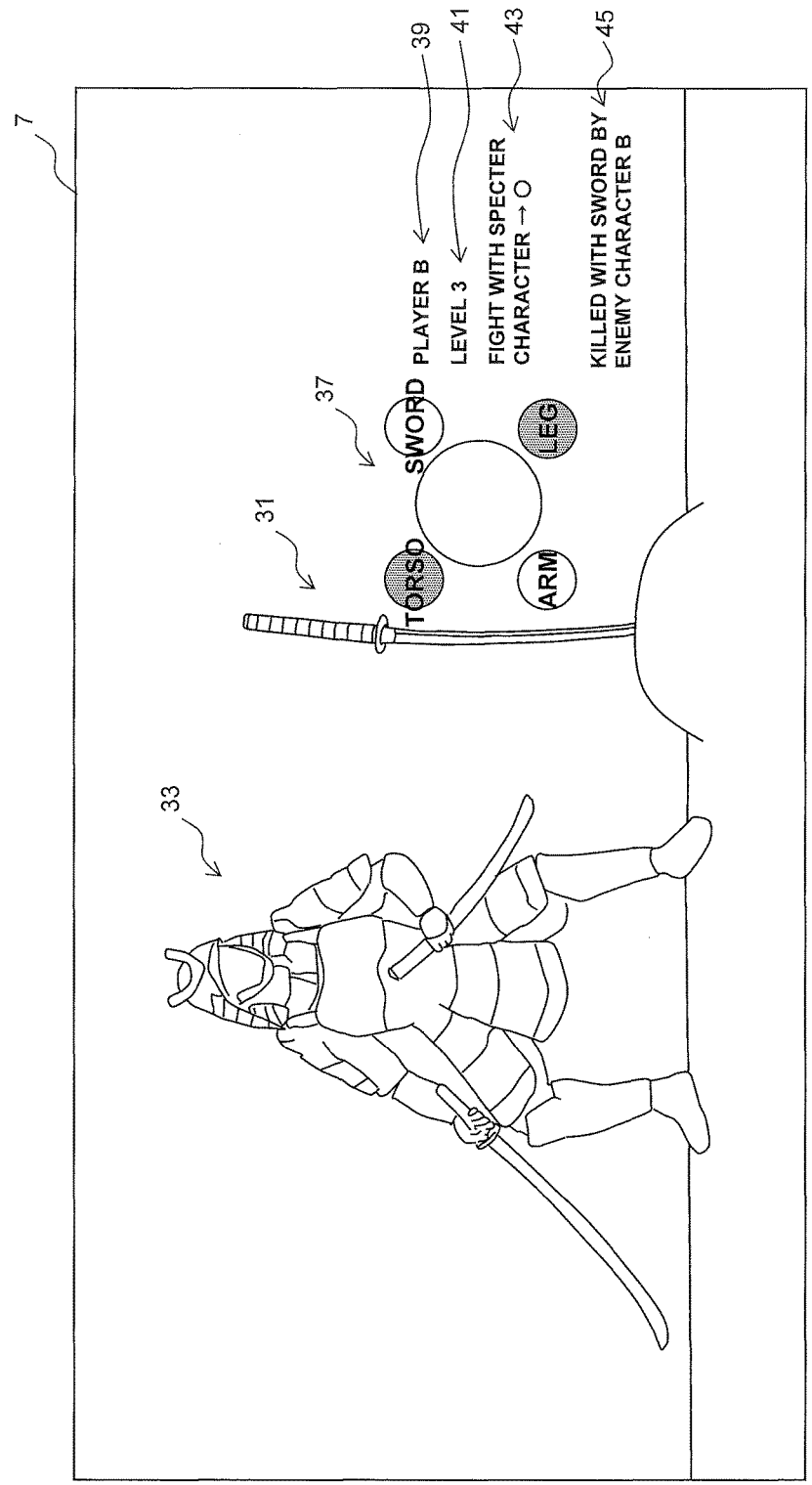
[FIG. 5]

[FIG. 6]
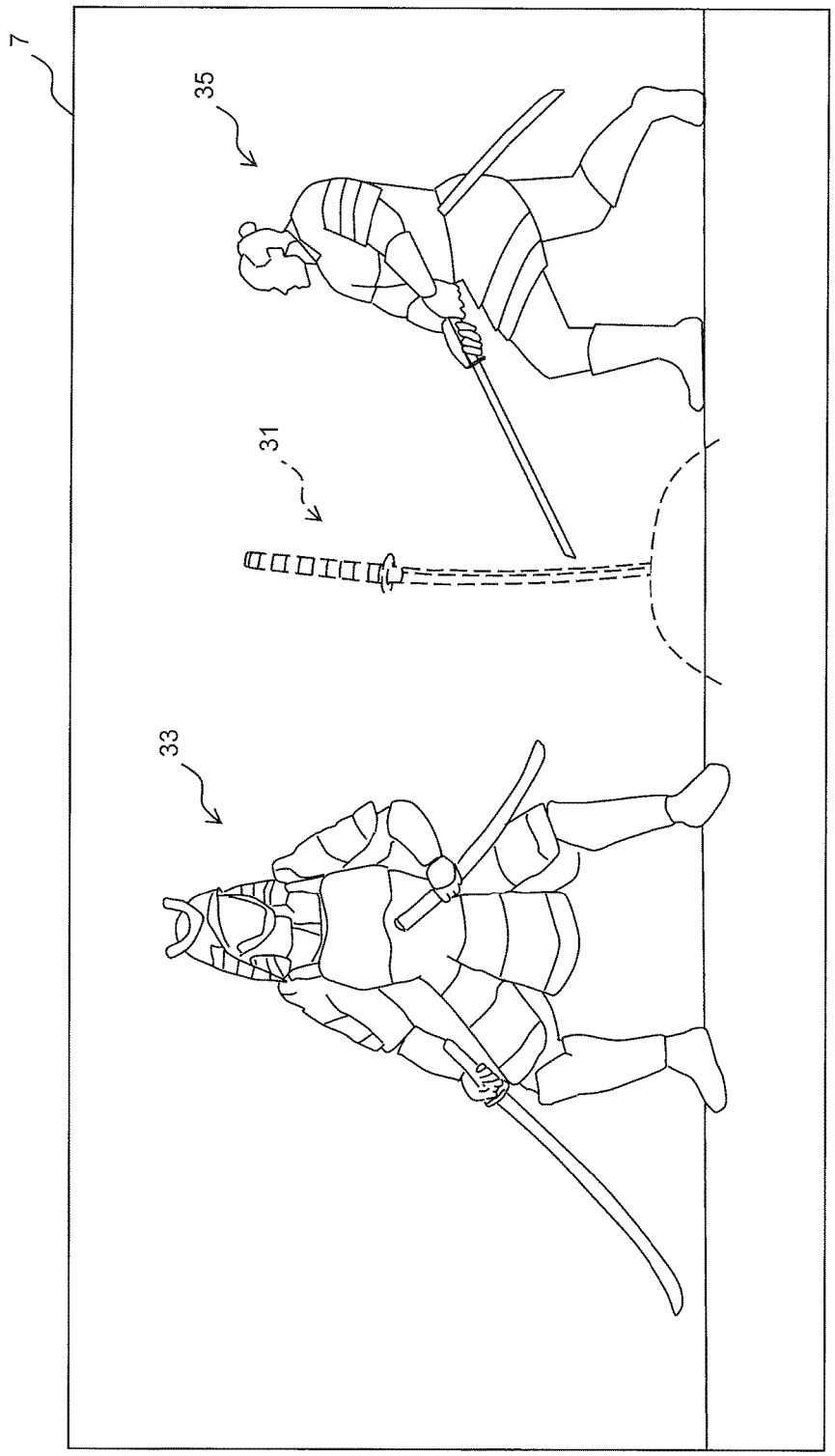

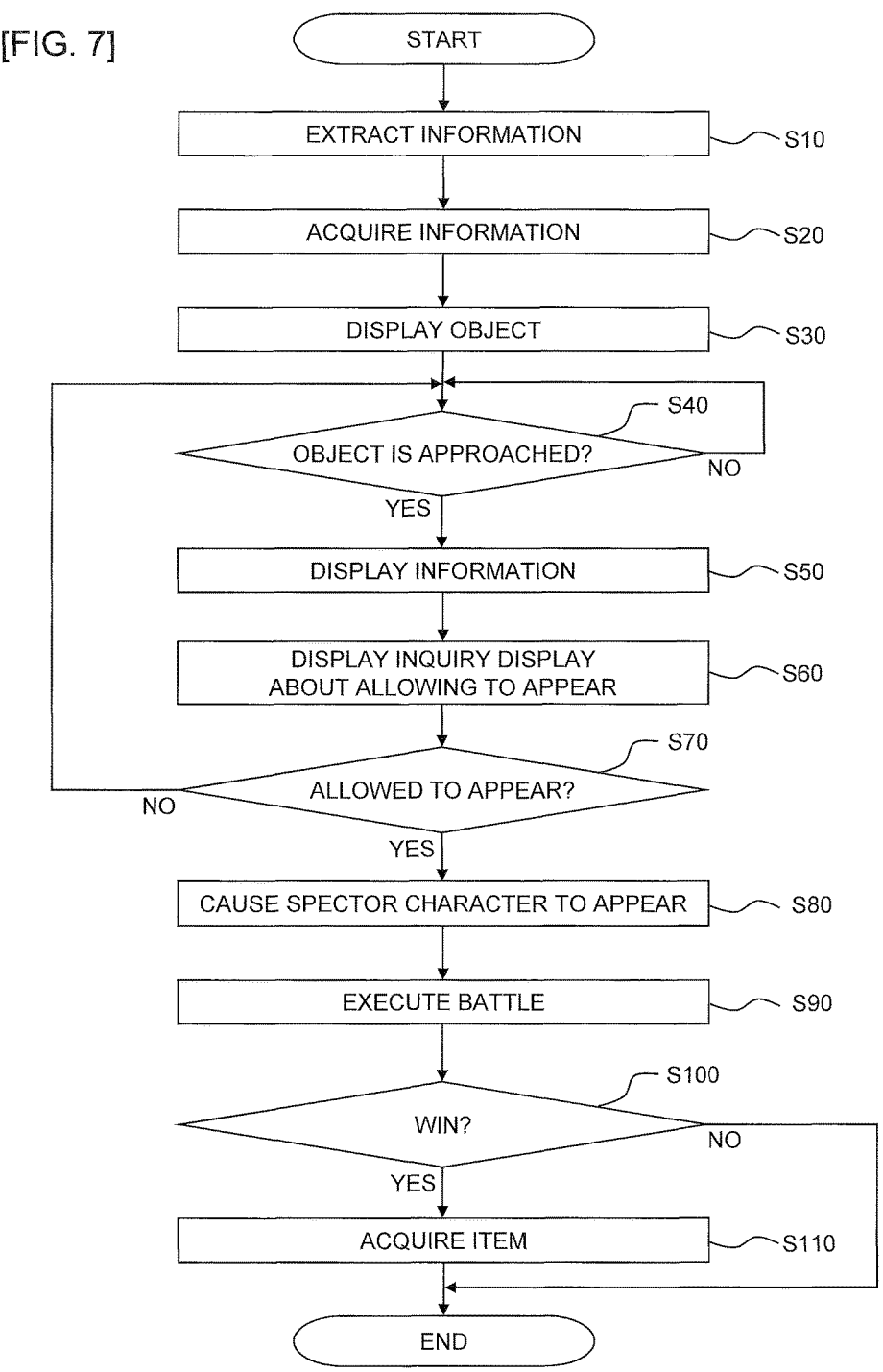

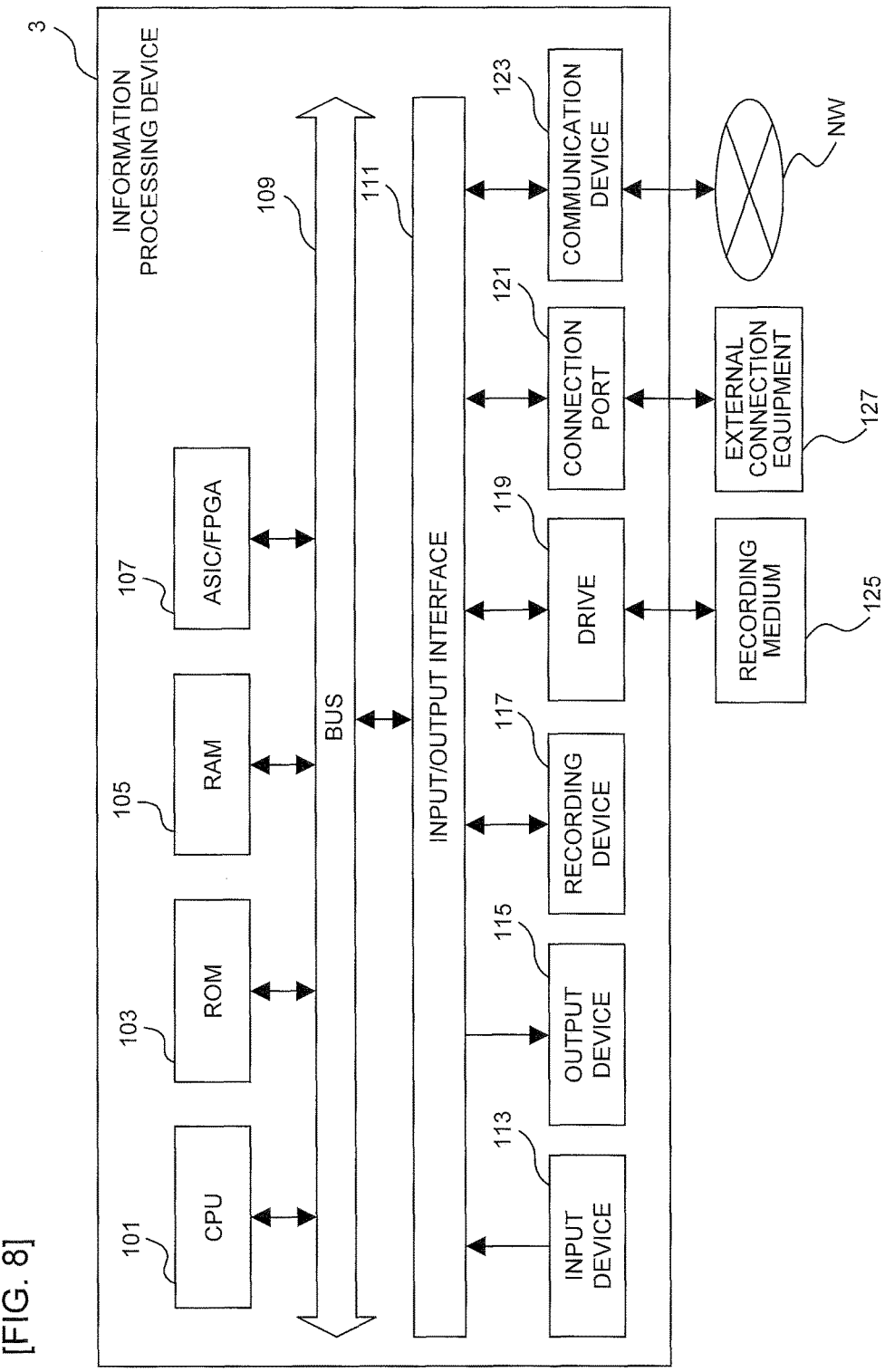

GAME PROCESSING METHOD AND RECORDING MEDIUM

CROSS-REFERENCE TO RELATED APPLICATION

The present application is based upon and claims the benefit of priority to Japanese Patent Application No. 2015-2319862, filed Nov. 27, 2015. The entire contents of this application are incorporated herein by reference.

BACKGROUND OF THE INVENTION

Field of the Invention

The present invention relates to a game processing method and a recording medium recording a game program.

Description of Background Art

As described in JP,A,2010-088695, a game control program is conventionally known that displays a mark such as a blood mark at a position of a player's character at the time of game over in another game device so as to indicate the game over. According to this game control program, when a player's character approaches the mark, the program makes an inquiry to a player about whether play data corresponding to the mark is reproduced and, if the reproduction is accepted, the corresponding play data is reproduced. This enables the player to comprehend the position of game over of the other player and to know in what situation the game is over.

SUMMARY OF THE INVENTION

In the conventional technique, the other player's play data is simply reproduced, and the player's character cannot perform any action capable of interfering with the play data. Therefore, this is not considered sufficient in terms of an entertainment performance.

The present invention was conceived in view of such a problem and it is therefore an object of the present invention to provide a game processing method and a recording medium recording a game program capable of improving an entertainment performance.

Means for Solving the Problem

To achieve the object, a game processing method of the present invention is characterized in that the game processing method is executed by an information processing device. The game processing method includes acquiring positional information of a first position of a first player character on a first game field when the first player character is put into a predetermined state, displaying an object at a second position on a second game field on which a second player character is located based on the positional information, the second position corresponding to the first position, and causing an enemy character with which the second player character is able to battle to appear on the second game field in association with the object, the enemy character corresponding to the first player character put into the predetermined state.

To achieve the object, a program recorded in a recording medium of the present invention is characterized in that the information processing device is caused to function as an information acquisition processing part, an object display processing part, and a character appearance processing part. The information acquisition processing part acquires positional information of a first position of a first player character on a first game field when the first player character is put into a predetermined state. The object display processing part displays an object at a second position on a second game field on which a second player character is located based on the positional information, the second position corresponds to the first position. The character appearance processing part causes an enemy character with which the second player character is able to battle to appear on the second game field in association with the object, the enemy character corresponding to the first player character put into the predetermined state.

The object enables the player to know the position at which the other player character (the first player character) is put into the predetermined state (e.g., a state of being unable to fight), and the number etc. of objects enable the player to comprehend a degree of risk of a corresponding area in the game field. As a result, for example, the area can be avoided in accordance with a level of a player character (the second player character) and, therefore, the player's convenience can be improved.

Additionally, the player character (the second player character) can battle with an enemy character appearing in association with the object (e.g., an enemy character appearing from the object). Since the enemy character making an appearance is a character corresponding to the other player character put into the predetermined state (the first player character. For example, the other player character put into the predetermined state at the position with the object displayed), the player can enjoy battling with a wide variety of enemy characters. Therefore, the game can be improved in the entertainment performance.

In the game processing method of the present invention, preferably, the acquiring the positional information includes acquiring the positional information when the first player character is put into a state of being unable to fight. The displaying the object includes displaying the object at the second position corresponding to the first position at which the first player character is put into the state of being unable to fight on the first game field. The causing the enemy character to appear includes causing the enemy character corresponding to the first player character put into the state of being unable to fight to appear in association with the object.

In the game program recorded in the recording medium of the present invention, preferably, the information acquisition processing part acquires the positional information when the first player character is put into a state of being unable to fight. The object display processing part displays the object at the second position corresponding to the first position at which the first player character is put into the state of being unable to fight on the first game field. The character appearance processing part causes the enemy character corresponding to the first player character put into the state of being unable to fight to appear in association with the object.

Preferably, the game processing method of the present invention further includes executing a battle between the enemy character and the second player character on the second game field.

Preferably, the game program recorded in the recording medium of the present invention further causes the information processing device to function as a battle execution processing part that executes a battle between the enemy character and the second player character on the second game field.

As a result, the player can enjoy battling with a wide variety of enemy characters corresponding to the other player character (the first player character).

Preferably, the game processing method of the present invention further includes inquiring to a player operating the second player character about whether to allow the enemy character to appear when the second player character is within a predetermined range from the object, and determining whether to allow the enemy character to appear in accordance with an input operation of the player. The causing the enemy character to appear includes causing the enemy character to appear in association with the object when determining to allow the enemy character to appear.

Preferably, the game program recorded in the recording medium of the present invention further causes the information processing device to function as an appearance propriety determination processing part that inquiries to a player operating the second player character about whether to allow the enemy character to appear when the second player character is within a predetermined range from the object, and determines whether to allow the enemy character to appear in accordance with an input operation of the player. The character appearance processing part causes the enemy character to appear in association with the object when the appearance propriety determination processing part determines to allow the enemy character to appear.

As a result, the player can select whether to allow an enemy character to appear in association with the object (e.g., whether to allow an enemy character to appear from the object). For example, if a remaining physical strength of the player character (the second player character) is small or if it is desired to preserve the physical strength in preparation for a subsequent fight, a battle with the enemy character can be avoided by not allowing the enemy character to appear. Alternatively, for example, if it is desired to grow the player character (the second player character) by causing the battle to occur or if it is desired to have an opportunity to acquire items of the enemy character (e.g., equipped items such as weapons and protectors or usable items such as recovery items and strengthening items), the enemy character can be allowed to appear so as to actively cause the battle to occur. Since whether to allow the enemy character to appear can be selected in accordance with player's needs in this way, the player's convenience can be improved.

In the game processing method of the present invention, preferably, the causing the enemy character to appear includes causing the enemy character to appear with a fighting strength corresponding to the first player character put into the state of being unable to fight.

In the game program recorded in the recording medium of the present invention, preferably, the character appearance processing part causes the enemy character to appear with a fighting strength corresponding to the first player character put into the state of being unable to fight.

As a result, the player can comprehend through the battle with the enemy character what level or fighting power etc. is required in the area for proceeding with the game (in other words, the player character (the second player character) at what level or with what fighting strength is possibly made unable to fight in the area). Therefore, the player's convenience can be improved.

Additionally, through the battle with the enemy character, the player can compare the strength of the player character (the second player character) at the time point of arrival at the stage with that of the other player character (the first player character). From the comparison result, the player can comprehend how the other player proceeds with the game etc. Therefore, the game can be improved in the entertainment performance.

Preferably, the game processing method of the present invention further includes displaying information on an item of the enemy character corresponding to the object when the second player character is within the predetermined range from the object.

Preferably, the game program recorded in the recording medium of the present invention further causes the information processing device to function as an information display processing part that displays information on an item of the enemy character corresponding to the object when the second player character is within the predetermined range from the object.

As a result, the player can comprehend the fighting strength of the enemy character by reference to the displayed information and therefore can use the information as a guide to determine whether to battle with the enemy character (whether to allow the enemy character to appear), so as to advantageously proceed with the game.

Additionally, by reference to the displayed information, the player can comprehend whether the enemy character is equipped with or possessed of an item desired by the player (e.g., an item that the player character (the second player character) is not equipped with or possessed of, or an item with better quality than the item that the player character (the second player character) is equipped with or possessed of). Therefore, the player can use the information as a guide to determine whether to battle with the enemy character (whether to allow the enemy character to appear), so as to have an opportunity to obtain such an item.

Preferably, the game processing method of the present invention further includes allowing the second player character to acquire the item of the defeated enemy character when the second player character wins in the battle between the enemy character and the second player character.

Preferably, the game program recorded in the recording medium of the present invention further causes the information processing device to function as an item acquisition processing part that allows the second player character to acquire the item of the defeated enemy character when the second player character wins in the battle executed by the battle execution processing part between the enemy character and the second player character.

As a result, the player character (second player character) can be allowed to acquire an item desired by the player (e.g., an item that the player character (the second player character) is not equipped with or possessed of, or an item with better quality than the item that the player character (the second player character) is equipped with or possessed of), so as to strengthen the player character (the second player character) or compensate for weakness. Consequently, the player can advantageously proceed with the game.

In the game processing method of the present invention, preferably, the displaying the information on the item includes displaying information on a cause of inability of the first player character corresponding to the object to fight when the second player character is within the predetermined range from the object.

In the game program recorded in the recording medium of the present invention, preferably, the information display processing part displays information on a cause of inability of the first player character corresponding to the object to fight when the second player character is within the predetermined range from the object.

As a result, the player can know how the other player character (the first player character) becomes unable to fight. Therefore, for example, the player can change the equipped items or a posture or recover the physical strength in preparation for the battle with the enemy or can take an action such as avoiding the encounter with an enemy and, therefore, the player's convenience can be improved.

Preferably, the game processing method of the present invention further includes extracting the positional information matching a predetermined condition out of a plurality of pieces of the positional information stored in a server. The acquiring the positional information includes acquiring the positional information out of the positional information extracted.

Preferably, the game program recorded in the recording medium of the present invention further causes the information processing device to function as a filter processing part that extracts the positional information matching a predetermined condition out of a plurality of pieces of the positional information stored in a server. The information acquisition processing part acquires the positional information out of the positional information extracted by the filter processing part.

As a result, for example, the positional information can be acquired to display the object with respect to only the other player character (the first player character) at a level corresponding to the stage level being played or the level of the player character (the second player character). Consequently, for example, an enemy character extremely different in strength as compared to the stage level etc. can be prevented from appearing and, therefore, the entertainment performance of the game can be prevented from being impaired.

Advantages of the Invention

The game processing method and the recording medium of the present invention can improve the entertainment performance.

BRIEF DESCRIPTION OF THE DRAWINGS

FIG. 1 is an explanatory view of an example of an overall configuration of a game system related to an embodiment.

FIG. 2 is a block diagram of an example of functional configurations of a server and an information processing device.

FIG. 3 is a table of an example of a data configuration of a database.

FIG. 4 is an explanatory view of an example of a screen on which an object is displayed.

FIG. 5 is an explanatory view of an example of a screen corresponding to a state of a player character located within a predetermined range from the object.

FIG. 6 is an explanatory view of an example of a screen corresponding to a state in which a specter character has appeared.

FIG. 7 is a flowchart of an example of process procedures executed by a CPU of the information processing device.

FIG. 8 is a block diagram of an example of a hardware configuration of the information processing device.

DETAILED DESCRIPTION OF THE EMBODIMENTS

An embodiment of the present invention will now be described with reference to the drawings.

1. Overall Configuration of Game System

First, an example of an overall configuration of a game system 1 related to this embodiment will be described with reference to FIG. 1. As shown in FIG. 1, the game system 1 has multiple information processing devices 3 and a server 9. Each of the multiple information processing devices 3 and the server 9 are connected in a communicable manner through a network NW such as a LAN and the Internet, for example.

The information processing device 3 is a stationary game machine. A controller 5 such as a game controller and a display device 7 such as a television set are connected to the information processing device 3 in a communicable manner. Although the case of wired connection is shown in FIG. 1, the connection may wirelessly be made. Although only the controller 5 and the display device 7 connected to one of the information processing devices 3 are shown in FIG. 1, the controllers 5 and the display devices 7 can also be connected to the other information processing devices 3.

The information processing device 3 is not limited to the stationary game machine and may be a portable game machine integrally including an input part and a display part. Other than the game machine, for example, the information processing device 3 may be one of those manufactured and sold as computers such as server computers, desktop computers, notebook computers, and tablet computers or those manufactured and sold as telephones such as portable telephones, smartphones, and tablets.

The games executable by the information processing device 3 include a game in which a player operates a player character 33 (see FIG. 5 described later) through the controller 5 to move in a game field and fight with an enemy character. This game will hereinafter be simply referred to as a "game." Additionally, although the model of the player character 33 is a human being in the examples in the following description, the model of the player character 33 may be an animal other than human beings or a machine such as a robot.

In the following description, out of multiple player characters 33 related to multiple players (it is noted that one player having multiple accounts can retain multiple player characters 33), the player character 33 operated by the player himself/herself (corresponding to an example of a "second player character") is simply referred to as "the player character 33," and the player character 33 different from the above player character 33, which is operated by another player other than himself/herself or by the player himself/herself playing with a different account (corresponding to an example of a "first player character"), is particularly referred to as "the other player character 33."

A game field on which the player character 33 is located corresponds to a "second game field" and a game field on which the other player character 33 is located corresponds to a "first game field."

In the game, the player character 33 modeled after a human being dies when a physical strength value becomes zero, for example. Examples of the cause of death include, for example, a death due to an attack of an enemy character, a death due to a geographical feature of a game field (e.g., death from a fall from a cliff), and a death due to a trap set in the game field. A "dead state" of the player character 33 corresponds to an example of a "state of being unable to fight", and the cause of death corresponds to a "cause of being unable to fight." The state of being unable to fight is not limited to the dead state of the player character 33 modeled after a human being and may be a state of being unable to fight because of being injured, stunned, nearly dead, petrified, paralyzed, cursed, spellbound, or bewitched (it is noted that the player character 33 may be in a movable state). Alternatively, when the player character 33 is modeled after a machine, the state of being unable to fight may be a state of being unable to fight because the player character 33 modeled after a machine is broken or runs out of energy (it is noted that the player character 33 may be in a movable state).

The "state of being unable to fight" corresponds to an example of a "predetermined state." However, the predetermined state is not limited to the state of being unable to fight and may be some kind of state in which the player character 33 is not made unable to fight (e.g., a state of being unable to move (unable to escape) due to a geographical feature, a trap, etc. on the game field).

The game involves an ability value such as a "level" indicative of a grade of strength of the player character 33. The game also involves "items." For example, the items include "equipped items" such as "weapons" and "protectors" and "usable items" such as "recovery items" and "strengthening items." The player character 33 can be possessed of and equipped with acquired weapons and protectors and can possess and use acquired recovery and strengthening items.

The information processing device 3 can transmit play information (described in detail later) at the time of death of the player character 33 through the network NW to the server 9.

The server 9 can acquire and store pieces of the play information transmitted from the multiple information processing devices 3 as a database. The server 9 can transmit the play information related to the other player character 33 stored as a database through the network NW to the information processing device 3 executing the game in which the player character 33 is operated. Although made up of one server in FIG. 1, the server 9 may be made up of multiple servers.

2. Database of Server

An example of contents of a database of the server 9 will be described with reference to FIGS. 2 and 3. Arrows shown in FIG. 2 indicate an example of signal flow and are not intended to limit the signal flow directions.

As shown in FIG. 2, the server 9 has a database 13. The database 13 stores pieces of the play information related to the multiple player characters 33. The play information includes a player name, level information of the player character 33, equipped item information of the player character 33, the other player character data (e.g., data forming the exterior of the player character 33, and fighting tendency information such as a posture of the player character 33), positional information on a game field on which the player character 33 is located, information on the cause of death, etc. at the time of death of the player character 33 in the game.

In particular, as shown in FIG. 3, the database 13 is provided with "player name" fields, "character level" fields, "equipped item" fields, "character data" fields, "position" fields, "cause of death" fields, etc. The "player name" fields each store a player name (e.g., an account name) out of the play information. The "character level" fields each store the level information of the player character 33 out of the play information. The "equipped items" fields each store the equipped item information of the player character 33 out of the play information. The "character data" fields each store the other player character data out of the play information. The "position" fields each store the positional information on a game field out of the play information. The "cause of death" fields each store the information on the cause of death out of the play information.

The play information stored in the database 13 is not limited to the information described above and may include information other than the above (e.g., game stage level information at the time of death of the player character 33, and information of possession items that are unequipped weapons/protectors and usable items at the time of death of the player character 33) or may not include some of the above.

Although the server 9 has constituent elements (such as a CPU, a memory, input/output devices, a recording device, and a communication device) for a typical computer along with the database 13, these elements will not be shown and described.

3. Functional Configuration of Information Processing Device

An example of a functional configuration of the information processing device 3 will be described with reference to FIGS. 2 and 4 to 6.

As shown in FIG. 2, the information processing device 3 has a communication device 123, a filter processing part 15, an information acquisition processing part 17, an object display processing part 19, an information display processing part 21, an appearance propriety determination processing part 23, a character appearance processing part 25, a battle execution processing part 27, an item acquisition processing part 29, and a recording device 117.

The communication device 123 communicates through the network NW with the server 9. A communication mode is not particularly limited as long as information can be transmitted and received.

The filter processing part 15 controls the communication device 123 to access the database 13 of the server 9 through the network NW and extract the play information related to the other player characters 33 matching a predetermined condition out of the pieces of the play information related to the multiple player characters 33 stored in the database 13.

An example of the predetermined condition is that a level (the level of the other player character 33) indicated by the level information in the play information is in the same range as the level of the player character 33 (e.g., within a level difference of about ±10). Another example is that, on the basis of the play information including stage level information of the game, a stage level (the stage level related to the other player character 33) indicated by the stage level information in the play information is in the same range as the stage level related to the player character 33 (e.g., within a level difference of about ±10). A further example is that a player (the other player) corresponding to a player name in the play information is one of the other players registered in the information processing device 3. The predetermined conditions described above are examples and other conditions may be used.

The filter processing part 15 may extract the play information related to all, or a predetermined number of, the other player characters 33 matching the predetermined condition. If the play information is extracted with respect to only the predetermined number of the player characters, the play information may be extracted at random or in accordance with some sort of criterion.

The information acquisition processing part 17 acquires the play information related to a predetermined number of the other player characters 33 at random out of the play information related to the other player characters 33 extracted by the filter processing part 15.

The information acquisition processing part 17 may acquire the play information related to the predetermined number of the other player characters 33 in accordance with some sort of criterion. Alternatively, the information acquisition processing part 17 may acquire the extracted play information related to all the other player character 33. Alternatively, the filter processing part 15 may not be included and the information acquisition processing part 17 may control the communication device 123 to access the database 13 of the server 9 through the network NW and acquire the play information related to the predetermined number of the other player characters 33 at random out of pieces of the play information related to the multiple player characters 33 stored in the database 13.

The processes of the filter processing part 15 and the information acquisition processing part 17 may be executed at constant time intervals (e.g., intervals of five minutes), or may be executed each time a frame is changed in the game being executed by the information processing device 3. These are enabled in an online state in which the information processing device 3 is connected to the network NW.

The recording device 117 is made up of a hard disk, for example. The play information related to the other player characters 33 acquired by the information acquisition processing part 17 may be recorded in the recording device 117. In this case, once the play information related to the other player characters 33 is acquired, a processing part such as the object display processing part 19 can execute a predetermined process based on the play information related to the other player characters 33 recorded in the recording device 117 even in an offline state in which the information processing device 3 is not connected to the network NW. Alternatively, the play information related to the other player characters 33 extracted by the filter processing part 15 may be recorded in the recording device 117. In this case, once the play information related to the other player characters 33 is extracted, the information acquisition processing part 17 can acquire the play information related to the predetermined number of the other player characters 33 at random out of the play information related to the other player characters 33 recorded in the recording device 117 even in an offline state in which the information processing device 3 is not connected to the network NW.

Based on the positional information in the play information related to the other player character 33 acquired by the information acquisition processing part 17 (positional information of a first position), the object display processing part 19 controls the display device 7 to display an object 31 (see FIG. 4 described later) at a position of death of the other player character 33 on a game field on which the player character 33 is located in the game being executed. The position of display of the object 31 (a second position) in this case may not exactly be the same as the position corresponding to the positional information (a first position) and may be a position near the position corresponding to the positional information or any position in an area including the position corresponding to the positional information (or an area immediately before or after the area).

Although not particularly limited, the object 31 is preferably an object suggestive of the death of the other player character 33 such as a "sword tumulus," a "tomb," a "coffin," and "corpse," for example.

FIG. 4 shows an example of a screen on which the object 31 is displayed. In the example shown in FIG. 4, the display device 7 displays a screen displaying the object 31 that is a "sword tumulus" with a sword stabbed into a round mound raised from the surrounding ground at the position of the death of the other player character 33 on the game field on which the player character 33 is located. In this screen, the player character 33 is not shown.

If the multiple other player characters 33 have died in the same area, the multiple objects 31 may be displayed. In this case, an upper limit may be set for the number of the objects 31 displayed at the same time in an area (or a screen) (e.g., the number of the objects per area is up to 10).

A form of display of the objects 31 may not be common to all the objects 31 and may differ between areas or may differ in accordance with an equipped item, a level, etc. of a specter character described later making an appearance.

Returning to FIG. 2, if the player character 33 is within a predetermined range from the object 31 in the game being executed, the information display processing part 21 controls the display device 7 to display predetermined information.

Specifically, based on the equipped item information in the play information related to the other player characters 33 acquired by the information acquisition processing part 17, the information display processing part 21 displays a display 37 (see FIG. 5 described later) including information on equipped items at the time of death of the other player character 33 related to the object 31 (in particular, equipped items of a specter character described later corresponding to the other player character 33). Although not particularly limited, the information on the equipped items displayed in this case includes, for example, types, rarities, names, and ability values of equipped items.

On the basis of the play information including the possession item information, the information display processing part 21 may display information on possession items at the time of death of the other player character 33 (in particular, possession items of a specter character described later corresponding to the other player character 33) (e.g., types, rarities, names, and effects of possession items), in addition to or instead of the information on equipped items of the other player character 33 related to the object 31.

Based on the player's name in the play information related to the other player characters 33 acquired by the information acquisition processing part 17, the information display processing part 21 displays a display 39 (see FIG. 5 described later) indicative of the other player's name corresponding to the other player character 33 related to the object 31.

Based on the level information in the play information related to the other player characters 33 acquired by the information acquisition processing part 17, the information display processing part 21 displays a display 41 (see FIG. 5 described later) indicative of the level at the time of death of the other player character 33 related to the object 31.

Based on the information on the cause of death in the play information related to the other player characters 33 acquired by the information acquisition processing part 17, the information display processing part 21 displays a display 45 (see FIG. 5 described later) indicative of information on the cause of death of the other player character 33 related to the object 31. In this example, the information on the cause of death of the other player character 33 includes information of an object (such as an enemy character, a geographical feature, and a trap) causing the death of the other player character 33.

The information displayed by the information display processing part 21 is not limited to the information described above and may include information other than the above or may not include some of the above.

If the player character 33 is within a predetermined range from the object 31 in the game being executed, the appearance propriety determination processing part 23 controls the display device 7 to display a display 43 (see FIG. 5 described later) making an inquiry to the player operating the player character 33 about whether to allow a specter character 35 to appear (see FIG. 6 described later). The specter character 35 is an enemy character that is the other dead player character 33 turned into a specter, and is an enemy character with which the player character 33 can battle.

FIG. 5 shows an example of a screen corresponding to a state in which the player character 33 is within a predetermined range from the object 31. In this description, it is assumed that the play information corresponding to the object 31 is the play information shown at the top of the table of FIG. 3.

In the example shown in FIG. 5, the player character 33 is equipped with a sword, a head protector, a torso protector, an arm protector, and a leg protector in this example and is present within a predetermined range from the object 31. The display 37 is displayed in the vicinity of the object 31 (to the right of the object 31 in this example). Specifically, the equipped item information in the play information shown at the top of the table of FIG. 3 indicates a "sword B," a "torso protector B," an "arm protector B," and a "leg protector B." The display 37 includes four objects having respective displays of texts indicative of respective types of these four equipped items (a text "sword" indicative of a "type: sword", text "torso" indicative of a "type: torso protector", a text "arm" indicative of a "type: arm protector", and a text "leg" indicative of a "type: leg protector"). The types of equipped items may be indicated by marks or codes. The objects related to highly rare equipped items (the "torso protector B" and the "leg protector B" in this example) among the four equipped items are displayed in a different form (in a different color in this example) as compared to the objects related to the other equipped items (the "sword B" and the "arm protector B" in this example).

The display 39 (a text "player B" in this example) is displayed in the vicinity of the object 31 (to the upper right of the display 37 in this example). The display 41 (a text "level 3" in this example) is displayed in the vicinity of the object 31 (under the display 39 in this example). The display 43 (a text "battle with specter character→○" in this example) is displayed in the vicinity of the object 31 (under the display 41 in this example). The display 45 (a text "killed with sword by enemy character A" in this example) is displayed in the vicinity of the object 31 (under the display 43 in this example).

Returning to FIG. 2, after displaying the display 43, the appearance propriety determination processing part 23 accepts a player's input operation through the controller 5 and determines whether to allow the specter character 35 to appear in accordance with the input operation. In particular, if an operation is performed for allowing the specter character 35 to appear (according to the display 43 shown in FIG. 5, a button "○" of the controller 5 is pressed), the appearance propriety determination processing part 23 determines to allow the specter character 35 to appear.

An operation of preventing the specter character 35 from appearing may be set and, if this operation is performed, the appearance propriety determination processing part 23 may determine to prevent the specter character 35 from appearing. In this case, the object 31 related to the determination of preventing the specter character 35 from appearing may disappear.

If the appearance propriety determination processing part 23 determines to allow the specter character 35 to appear, the character appearance processing part 25 controls the display device 7 to cause the specter character 35 to appear in association with the object 31 (form the object 31 in this example) and cause the object 31 to disappear. In this case, based on the other player character data in the play information related to the other player characters 33 acquired by the information acquisition processing part 17, the character appearance processing part 25 causes the specter character 35 to appear with the exterior and the fighting strength (i.e., with the equipped items, the ability value such as a level, and the fighting tendency such as a posture) at the time of death of the other player character 33 related to the object 31.

The place of the specter character 35 caused to appear by the character appearance processing part 25 may not be the object 31 itself as long as the place is associated with the object 31, and may be a position near the object 31, a predetermined or random position within an area in which the object 31 is present, etc.

The enemy character caused to appear by the character appearance processing part 25 is not particularly limited as long as the enemy character can battle with the player character 33 and has a character form corresponding to the other player character 33 that have died. For example, the enemy character may be the same character as the other player character 33 that have died. However, the enemy character preferably has a character farm suggestive of the dead of the other player character 33, such as a "specter," a "zombie," and a "ghost," for example.

FIG. 6 shows an example of a screen corresponding to a state in which the specter character 35 has appeared. In the example shown in FIG. 6, the display device 7 displays a screen in which the specter character 35 has appeared from the object 31 near the player character 33. The specter character 35 in this example is equipped with a sword, a torso protector, an arm protector, and a leg protector. In this screen, the object 31 at the place of appearance of the specter character 35 has disappeared.

The exterior of the specter character 35 may be a preset exterior. The object 31 may not be caused to disappear even after the specter character 35 has appeared and, for example, the object 31 may be caused to disappear after the player character 33 defeats the specter character 35 as described later. The one object 31 may be correlated with pieces of the play information to cause the multiple specter characters 35 to appear from the one object 31.

When the player character 33 falls within a predetermined range from the object 31, the character appearance processing part 25 may cause the specter character 35 to appear from the object 31 without allowing the player to select whether to allow the specter character 35 to appear (in this case, the appearance propriety determination processing part 23 can be eliminated).

Returning to FIG. 2, the battle execution processing part 27 operates the specter character 35 caused to appear by the character appearance processing part 25 in accordance with so-called AI (AI reflecting the fighting tendency of the other player character 33 as described above) and operates the player character 33 in accordance with a player's input operation through the controller 5, so as to execute a battle between the specter character 35 and the player character 33.

Even when the specter character 35 appears, for example, the player character 33 may be able to avoid the battle with the specter character 35 by escaping etc. In this case, the specter character 35 having appeared may be returned to the original object 31 after a certain time has elapsed.

If the player character 33 defeats the specter character 35 and wins the battle between the specter character 35 and the player character 33 executed by the battle execution processing part 27, the item acquisition processing part 29 allows the player character 33 to acquire one or more equipped items at random out of the equipped items of the defeated specter character 35. The item acquisition processing part 29 may allow the player character 33 to acquire the possession items of the defeated specter character 35 in addition to or instead of the equipped items of the defeated specter character 35. The item acquisition processing part 29 may allow the player to select whether to allow the player character 33 to acquire the items of the defeated specter character 35, and may not allow the player character 33 to acquire the items in some cases. In addition to the items of the defeated specter character 35, the player character 33 may be allowed to acquire a so-called experience point or may be allowed to acquire a player record of the other player (e.g., a game play time, the number of times of death of the player character 33, and the number of defeated enemy characters).

The processes etc. or the processing parts described above are not limited to the example of allocation of these processes and, for example, the processes may be executed by a fewer number of processing parts (e.g., one processing part) or may be executed by more finely divided processing parts. The functions of the processing parts described above are implemented by a game program executed by a CPU 101 (see FIG. 8) described later or may partially be implemented by actual devices such as dedicated integrated circuits including ASICs and FPGAs, and other electric circuits, for example.

4. Process Procedures Executed by Information Processing Device

An example of process procedures executed by the CPU 101 of the information processing device 3 will be described with reference to FIG. 7.

At step S10, the information processing device 3 uses the filter processing part 15 to access the database 13 of the server 9 and extract the play information related to the other player characters 33 matching the predetermined condition out of the pieces of the play information related to the multiple player characters 33 stored in the database 13.

At step S20, the information processing device 3 uses the information acquisition processing part 17 to acquire the play information related to a predetermined number of the other player characters 33 at random out of the play information related to the other player characters 33 extracted at step S10.

At step S30, the information processing device 3 uses the object display processing part 19 to display the object 31 at the position of death of the other player character 33 on the game field on which the player character 33 is located, based on the positional information in the play information related to the other player characters 33 acquired at step S20.

At step S40, the information processing device 3 determines whether the player character 33 falls within the predetermined range of the object 31. If the player character 33 does not fall within the predetermined range of the object 31, the determination is negative, and the information processing device 3 waits in a loop. If the player character 33 falls within the predetermined range of the object 31, the determination is affirmative, and the information processing device 3 goes to step S50.

At step S50, the information processing device 3 uses the information display processing part 21 to display the display 37 related to the equipped items, the display 39 indicative of the other player's name, the display 41 indicative of the level, and the display 45 related to the cause of death with respect to the other player character 33 related to the object 31 based on the equipped item information, the player name, the level information, and the information on the cause of death in the play information related to the other player characters 33 acquired at step S20.

At step S60, the information processing device 3 uses the appearance propriety determination processing part 23 to display the display 43 making an inquiry to the player about whether to allow the specter character 35 to appear.

At step S70, the information processing device 3 uses the appearance propriety determination processing part 23 to accept a player's input operation through the controller 5 and determine whether an operation of allowing the specter character 35 to appear is performed. If the operation of allowing the specter character 35 to appear is not performed, the determination of step S70 is negative, and the information processing device 3 returns to step S40 to repeat the same procedure. If the operation of allowing the specter character 35 to appear is performed, the determination of step S70 is affirmative, and the information processing device 3 uses the appearance propriety determination processing part 23 to determine to allow the specter character 35 to appear and returns to step S80.

At step S80, the information processing device 3 uses the character appearance processing part 25 to cause the specter character 35 to appear from the object 31 while causing the object 31 to disappear.

At step S90, the information processing device 3 used the battle execution processing part 27 to execute the battle between the specter character 35 caused to appear at step S80 and the player character 33.

At step S100, the information processing device 3 determines whether the player character 33 wins in the battle executed at step S90 between the specter character 35 and the player character 33. If the player character 33 looses, the determination of step S100 is negative, and this flowchart is terminated. If the player character 33 wins, the determination of step S100 is affirmative, and the information processing device 3 goes to step S110.

At step S110, the information processing device 3 uses the item acquisition processing part 29 to allow the player character 33 to acquire one or more equipped items at random from the equipped items of the defeated specter character 35. The flowchart is then terminated.

The process procedures described above are an example, and the procedures may at least partially be deleted or changed or a procedure other than the above may be added. The order of the above procedures may at least partially be changed.

5. Hardware Configuration Example of the Information Processing Device

A hardware configuration example will be described for the information processing device 3 achieving the processing parts implemented by a program executed by the CPU 101 described above, with reference to FIG. 8.

As shown in FIG. 8, the information processing device 3 has, for example, a CPU 101, a ROM 103, a RAM 105, a dedicated integrated circuit 107 constructed for specific use such as an ASIC or an FPGA, an input device 113, an output device 115, a recording device 117, a drive 119, a connection port 121, and a communication device 123. These constituent elements are mutually connected via a bus 109 and an input/output (I/O) interface 111 such that signals can be transferred.

The game program can be recorded in a recording device such as the ROM 103, the RAM 105, and the recording device 117, for example.

The game program can also temporarily or permanently be recorded in a removable recording medium 125 such as magnetic disks including flexible disks, various optical disks including CDs, MO disks, and DVDs, and semiconductor memories. The recording medium 125 as described above can be provided as so-called packaged software. In this case, the game program recorded in the recording medium 125 may be read by the drive 119 and recorded in the recording device 117 through the I/O interface 111, the bus 109, etc.

The game program may be recorded in, for example, a download site, another computer, or another recording medium (not shown). In this case, the game program is transferred through a network NW such as a LAN and the Internet and the communication device 123 receives this program. The program received by the communication device 123 may be recorded in the recording device 117 through the I/O interface 111, the bus 109, etc.

The game program may be recorded in appropriate external connection equipment 127, for example. In this case, the game program may be transferred through the appropriate connection port 121 and recorded in the recording device 117 through the I/O interface 111, the bus 109, etc.

The CPU 101 executes various process in accordance with the program recorded in the recording device 117 to implement the processes of the information acquisition processing part 17, the object display processing part 19, etc. In this case, the CPU 101 may directly read and execute the program from the recording device 117 or may be execute the program once loaded in the RAM 105. In the case that the CPU 101 receives the program through, for example, the communication device 123, the drive 119, or the connection port 121, the CPU 101 may directly execute the received program without recording in the recording device 117.

The CPU 101 may execute various processes based on a signal or information input from the input device 113 such as the controller 5 described above, a mouse, a keyboard, and a microphone as needed.

The CPU 101 may output a result of execution of the process from the output device 115 such as a display device 7 and a sound output device (not shown), for example, and the CPU 101 may transmit this process result to the communication device 123 or the connection port 121 as needed or may record the process result into the recording device 117 or the recording medium 125.

6. Effect of Embodiment

As described above, the game program of the embodiment drives the information processing device 3 to act as the information acquisition processing part 17, the object display processing part 19, and the character appearance processing part 25. The information processing device 3 acquires the positional information on the game field on which the other player character 33 is located, when the other player character 33 is put into a predetermined state (in this embodiment, a dead state that is an example of the state of being unable to fight). Based on the positional information, the object display processing part 19 displays the object 31 at the position of death of the other player character 33 on the game field on which the player character 33 is located. The character appearance processing part 25 causes the specter character 35 to appear from the object 31, and the specter character 35 is an enemy character corresponding to the other dead player character 33 and is an enemy character with which the player character 33 can battle.

The object 31 enables the player to know the position of death of the other player character 33, and the number etc. of the objects 31 enable the player to comprehend a degree of risk of the area in the game field. As a result, for example, the area can be avoided in accordance with the level of the player character 33 and, therefore, the player's convenience can be improved.

Additionally, the player character 33 can battle with the specter character 35 appearing from the object 31. Since the specter character 35 making an appearance is a character corresponding to the other dead player character 33, the player can enjoy battling with a wide variety of the specter characters 35. Therefore, the game can be improved in the entertainment performance.

The game program of this embodiment drives the information processing device 3 to further act as the battle execution processing part 27. The battle execution processing part 27 executes a battle between the specter character 35 and the player character 33. As a result, the player can enjoy battling with a wide variety of the specter characters 35 corresponding to the other player character 33.

The game program of this embodiment allows the information processing device 3 to further act as the appearance propriety determination processing part 23. If the player character 33 is within the predetermined range from the object 31, the appearance propriety determination processing part 23 makes an inquiry to the player about whether to allow the specter character 35 to appear and determines whether to allow the specter character 35 to appear in accordance with an input operation of the player. If the appearance propriety determination processing part 23 determines to allow the specter character 35 to appear, the character appearance processing part 25 causes the specter character 35 to appear from the object 31.

As a result, the player can select whether to allow the specter character 35 to appear from the object 31. For example, if a remaining physical strength of the player character 33 is small or if it is desired to preserve the physical strength in preparation for a subsequent fight, a battle with the specter character 35 can be avoided by not allowing the specter character 35 to appear. Alternatively, for example, if it is desired to grow the player character 33 by causing the battle to occur or if it is desired to have an opportunity to acquire items of the specter character 35, the specter character 35 can be allowed to appear so as to actively cause the battle to occur. Since whether to allow the specter character 35 to appear can be selected in accordance with player's needs in this way, the player's convenience can be improved.

Particularly in this embodiment, the character appearance processing part 25 causes the specter character 35 to appear with a fighting strength corresponding to the other dead player character 33. As a result, the player can comprehend through the battle with the specter character 35 what level or fighting power etc. is required in the area for proceeding with the game (in other words, the player character 33 at what level or with what fighting strength is possibly killed in the area). Therefore, the player's convenience can be improved.

Additionally, through the battle with the specter character 35, the player can compare the strength of the player character 33 at the time point of arrival at the stage with that of the other player character 33. From the comparison result, the player can comprehend how the other player proceeds with the game etc. Therefore, the game can be improved in the entertainment performance.

The game program of this embodiment drives the information processing device 3 to further act as the information display processing part 21. If the player character 33 is within the predetermined range from the object 31, the information display processing part 21 displays the information on the equipped items of the other player character 33 corresponding to the object 31. As a result, the player can comprehend the fighting strength of the specter character 35 by reference to the displayed information and therefore can use the information as a guide to determine whether to battle with the specter character 35 (whether to allow the specter character 35 to appear), so as to advantageously proceed with the game.

Additionally, by reference to the displayed information, the player can comprehend whether the specter character 35 is equipped with an equipped item desired by the player (e.g., an equipped item that the player character 33 is not equipped with or possessed of, or an equipped item with better quality than the equipped item that the player character 33 is equipped with or possessed of). Therefore, the player can use the information as a guide to determine whether to battle with the specter character 35 (whether to allow the specter character 35 to appear), so as to have an opportunity to obtain such an equipped item.

The game program of this embodiment drives the information processing device 3 to further act as the item acquisition processing part 29. If the player character 33 wins in the battle executed by the battle execution processing part 27 between the specter character 35 and the player character 33, the item acquisition processing part 29 allows the player character 33 to acquire the equipped items of the defeated specter character 35. As a result, the player character 33 can be allowed to acquire an equipped item desired by the player (e.g., an equipped item that the player character 33 is not equipped with or possessed of, or an equipped item with better quality than the equipped item that the player character 33 is equipped with or possessed of), so as to strengthen the player character 33 or compensate for weakness. Consequently, the player can advantageously proceed with the game.

Particularly in this embodiment, if the player character 33 is within the predetermined range from the object 31, the information display processing part 21 displays information on the cause of death of the other player character 33 corresponding to the object 31. As a result, the player can know how the other player character 33 has died. Therefore, for example, the player can change the equipped items or a posture or recover the physical strength in preparation for the battle with the enemy or can take an action such as avoiding the encounter with an enemy and, therefore, the player's convenience can be improved.

The game program of this embodiment drives the information processing device 3 to further act as the filter processing part 15. The filter processing part 15 extracts the positional information matching a predetermined condition out of pieces of positional information stored in the server 9. The information acquisition processing part 17 acquires the positional information out of the positional information extracted by the filter processing part 15. As a result, for example, the positional information can be acquired to display the object 31 with respect to only the other player character 33 at a level corresponding to the stage level being played or the level of the player character 33. Consequently, for example, the specter character 35 extremely different in strength as compared to the stage level etc. Can be prevented from appearing and, therefore, the entertainment performance of the game can be prevented from being impaired.

7. Modification Example Etc.

The present invention is not limited to the embodiment and may variously be modified without departing from the spirit and the technical ideas thereof. For example, a predetermined number of the objects 31 may be displayed as preset objects on the game field on which the player character 33 is located during the game being executed, and the specter character 35 may be caused to appear under the same condition as described above. In this case, even a player using the information processing device 3 offline without entering an online state can enjoy battling with the specter characters 35, and the game can be improved in the entertainment performance.

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present invention.

What is claimed is:

1. A game processing method executed by an information processing device, comprising:
   acquiring positional information of a first position of a first player character for a first player on a first game field when the first player character is put into a predetermined state, wherein the first position is a position at a particular time when the first player character is put into the predetermined state;
   displaying an object at a second position on a second game field on which a second player character for a second player is located based on the positional information, the second position corresponding to the first position; and
   causing an enemy character with which the second player character is able to battle to appear on the second game field in association with the object, the enemy character corresponding to the first player character put into the predetermined state,
   wherein the first player is a first actual player,
   wherein the second player is a second actual player,
   wherein the enemy character is a character version of the first player character,
   wherein the positional information of the first position is acquired when the first player character is controlled by the first actual player, and
   wherein the enemy character is controlled by the information processing device without input from an actual player.

2. The game processing method according to claim 1,
   wherein the acquiring the positional information comprises
      acquiring the positional information when the first player character is put into a state of being unable to fight,
   wherein the displaying the object comprises
      displaying the object at the second position corresponding to the first position at which the first player character is put into the state of being unable to fight on the first game field, and wherein the causing the enemy character to appear comprises causing the enemy character corresponding to the first player character put into the state of being unable to fight to appear in association with the object.

3. The game processing method according to claim 2, further comprising:

executing a battle between the enemy character and the second player character on the second game field.

4. The game processing method according to claim 3, further comprising:

inquiring to a player operating the second player character about whether to allow the enemy character to appear when the second player character is within a predetermined range from the object; and determining whether to allow the enemy character to appear in accordance with an input operation of the player, and wherein the causing the enemy character to appear comprises causing the enemy character to appear in association with the object when determining to allow the enemy character to appear.

5. The game processing method according to claim 4, wherein the causing the enemy character to appear comprises causing the enemy character to appear with a fighting strength corresponding to the first player character put into the state of being unable to fight.

6. The game processing method according to claim 5, further comprising:

displaying information on an item of the enemy character corresponding to the object when the second player character is within the predetermined range from the object.

7. The game processing method according to claim 6, further comprising:

allowing the second player character to acquire the item of the defeated enemy character when the second player character wins in the battle between the enemy character and the second player character.

8. The game processing method according to claim 7, wherein the displaying the information on the item comprises displaying information on a cause of inability of the first player character corresponding to the object to fight when the second player character is within the predetermined range from the object.

9. The game processing method according to claim 8, further comprising:

extracting the positional information matching a predetermined condition out of a plurality of pieces of the positional information stored in a server, and wherein the acquiring the positional information comprises acquiring the positional information out of the positional information extracted.

10. The game processing method according to claim 1, wherein the character version is a same character as the first player character or another character suggestive of a dead version of the first player character, and wherein the another character includes any one of a specter character of the first player character, a zombie character of the first player character, or a ghost character of the first player character.

11. The game processing method according to claim 1, wherein the acquiring the positional information includes acquiring positional information of at least one of an equipped item information and a possession item information of the first player character when the first player character is put into the predetermined state, further comprising displaying at least one of information on an equipped item and information on a possession item of the first player character based on the at least one of the equipped item information and the possession item information when the second player character is within a predetermined range from the object, and wherein the causing the enemy character to appear includes causing the enemy character that possesses at least one of the equipped item and the possession item and with which the second player character is able to battle to appear on the second game field in association with the object.

12. A non-transitory recording medium readable by an information processing device, the recording medium storing a game program causing the information processing device to function as:

an information acquisition processing part that acquires positional information of a first position of a first player character for a first player on a first game field when the first player character is put into a predetermined state, wherein the first position is a position at a particular time when the first player character is put into the predetermined state;

an object display processing part that displays an object at a second position on a second game field on which a second player character for a second player is located based on the positional information, the second position corresponding to the first position; and a character appearance processing part that causes an enemy character with which the second player character is able to battle to appear on the second game field in association with the object, the enemy character corresponding to the first player character put into the predetermined state, wherein the first player is a first actual player, wherein the second player is a second actual player, wherein the enemy character is a character version of the first player character, wherein the information acquisition processing part acquires the positional information of the first position when the first player character is controlled by the first actual player, and wherein the enemy character is controlled by the information processing device without input from an actual player.

13. The recording medium according to claim 12, wherein the information acquisition processing part acquires the positional information when the first player character is put into a state of being unable to fight, wherein the object display processing part displays the object at the second position corresponding to the first position at which the first player character is put into the state of being unable to fight on the first game field, and wherein the character appearance processing part causes the enemy character corresponding to the first player character put into the state of being unable to fight to appear in association with the object.

14. The recording medium according to claim 13, the game program further causing the information processing device to function as:
- a battle execution processing part that executes a battle between the enemy character and the second player character on the second game field.

15. The recording medium according to claim 14, the game program further causing the information processing device to function as:
- an appearance propriety determination processing part that inquiries to a player operating the second player character about whether to allow the enemy character to appear when the second player character is within a predetermined range from the object, and determines whether to allow the enemy character to appear in accordance with an input operation of the player, and
- wherein the character appearance processing part causes the enemy character to appear in association with the object when the appearance propriety determination processing part determines to allow the enemy character to appear.

16. The recording medium according to claim 15,
- wherein the character appearance processing part causes the enemy character to appear with a fighting strength corresponding to the first player character put into the state of being unable to fight.

17. The recording medium according to claim 16, the game program further causing the information processing device to function as:
- an information display processing part that displays information on an item of the enemy character corresponding to the object when the second player character is within the predetermined range from the object.

18. The recording medium according to claim 17, the game program further causing the information processing device to function as:
- an item acquisition processing part that allows the second player character to acquire the item of the defeated enemy character when the second player character wins in the battle executed by the battle execution processing part between the enemy character and the second player character.

19. The recording medium according to claim 18,
- wherein the information display processing part displays information on a cause of inability of the first player character corresponding to the object to fight when the second player character is within the predetermined range from the object.

20. The recording medium according to claim 19, the game program further causing the information processing device to function as:
- a filter processing part that extracts the positional information matching a predetermined condition out of a plurality of pieces of the positional information stored in a server, and
- wherein the information acquisition processing part acquires the positional information out of the positional information extracted by the filter processing part.

21. The recording medium according to claim 12,
- wherein the character version is a same character as the first player character or another character suggestive of a dead version of the first player character, and
- wherein the another character includes any one of a specter character of the first player character, a zombie character of the first player character, or a ghost character of the first player character.

22. The recording medium according to claim 12,
- wherein the information acquisition processing part acquires positional information of at least one of an equipped item information and a possession item information of the first player character when the first player character is put into a predetermined state,
- further comprising an information display processing part that displays at least one of information on an equipped item and information on a possession item of the first player character based on the at least one of the equipped item information and the possession item information when the second player character is within a predetermined range from the object, and
- wherein the character appearance processing part that causes the enemy character that possesses at least one of the equipped item and the possession item and with which the second player character is able to battle to appear on the second game field in association with the object.

* * * * *